US012361822B2

(12) United States Patent
Clifford

(10) Patent No.: US 12,361,822 B2
(45) **Date of Patent: *Jul. 15, 2025**

(54) ROAD ELEMENT SENSORS AND IDENTIFIERS

(71) Applicant: Cavnue Technology, LLC, Brooklyn, NY (US)

(72) Inventor: David Hahn Clifford, Royal Oak, MI (US)

(73) Assignee: Cavnue Technology, LLC, Arlington, VA (US)

( * ) Notice: Subject to any disclaimer, the term of this patent is extended or adjusted under 35 U.S.C. 154(b) by 227 days.

This patent is subject to a terminal disclaimer.

(21) Appl. No.: 18/152,521

(22) Filed: Jan. 10, 2023

(65) Prior Publication Data

US 2023/0145429 A1 May 11, 2023

Related U.S. Application Data

(63) Continuation of application No. 17/465,480, filed on Sep. 2, 2021, now Pat. No. 11,610,480, which is a (Continued)

(51) Int. Cl.
*G08G 1/017* (2006.01)
*G08G 1/01* (2006.01)

(52) U.S. Cl.
CPC .......... *G08G 1/017* (2013.01); *G08G 1/0116* (2013.01); *G08G 1/0133* (2013.01)

(58) Field of Classification Search
CPC .... G08G 1/017; G08G 1/0116; G08G 1/0133; G08G 1/04; G08G 1/052
(Continued)

(56) References Cited

U.S. PATENT DOCUMENTS 5,801,943 A * 9/1998 Nasburg .......... G08G 1/096775 340/910
8,903,636 B1 * 12/2014 Al Kandari .......... G08G 1/0145 701/118
(Continued)

FOREIGN PATENT DOCUMENTS

WO WO 2018099574 A1 6/2018

OTHER PUBLICATIONS

Hu et al, "A multirange vehicle speed prediction with application to model predictive control-based integrated power and thermal management of connected hybrid electric vehicles" ASME, 2022, 11 pages.
(Continued)

*Primary Examiner* — Anh V La
(74) *Attorney, Agent, or Firm* — Fish & Richardson P.C.

(57) ABSTRACT

Systems and techniques are described for identifying, monitoring, and sharing vehicle information amongst sensors. In some implementations, a system includes a central server and a plurality of sensors. The plurality of sensors are positioned in a fixed location relative to a roadway. Each sensor in the plurality of sensors is configured to: detect vehicles in a first field of view on the roadway. For each detected vehicle, each sensor is configured to identify features of the detected vehicle and perform operations for each feature. The operations include generating feature data representing the feature, generating a unique identification of the detected vehicle from the detected vehicles by concatenating the feature data representing the identified features of the detected vehicle, and adding the unique identification to a list.

12 Claims, 4 Drawing Sheets

Related U.S. Application Data continuation of application No. 17/210,099, filed on Mar. 23, 2021, now Pat. No. 11,138,873.

(58) Field of Classification Search
USPC .......................... 340/937, 905, 903, 435, 436
See application file for complete search history.

(56) References Cited

U.S. PATENT DOCUMENTS

| | | | |
|---|---|---|---|
| 8,948,972 | B2 | 2/2015 | Liu et al. |
| 9,373,257 | B2 | 6/2016 | Bonhomme |
| 9,719,801 | B1 | 8/2017 | Ferguson et al. |
| 10,565,870 | B2 | 2/2020 | Gupta et al. |
| 10,796,567 | B1 | 10/2020 | Tang |
| 10,977,939 | B2 | 4/2021 | Zhang et al. |
| 11,138,873 | B1 * | 10/2021 | Clifford .................... G08G 1/04 |
| 2008/0166023 | A1 * | 7/2008 | Wang ......................... G06T 7/20 356/27 |
| 2014/0195138 | A1 | 7/2014 | Stelzig |
| 2016/0323233 | A1 | 11/2016 | Song et al. |
| 2016/0364921 | A1 | 12/2016 | Iyoda et al. |
| 2017/0140645 | A1 | 5/2017 | Balid et al. |
| 2018/0240336 | A1 * | 8/2018 | Kareev .................. G06V 20/62 |
| 2018/0253964 | A1 | 9/2018 | Wong et al. |
| 2019/0063938 | A1 | 2/2019 | Fukushima |
| 2019/0132709 | A1 | 5/2019 | Graefe |
| 2019/0212153 | A1 * | 7/2019 | Adireddy ............. G08G 1/0112 |
| 2020/0043339 | A1 | 2/2020 | Kozaki |
| 2020/0111346 | A1 | 4/2020 | Kodanna |
| 2020/0342620 | A1 * | 10/2020 | Zagajac .................... G06T 7/60 |
| 2020/0342755 | A1 | 10/2020 | Nguyen et al. |
| 2021/0043076 | A1 | 2/2021 | Yusa |
| 2021/0318691 | A1 | 10/2021 | Amini et al. |

OTHER PUBLICATIONS

International Search Report and Written Opinion in International Appln. No. PCT/US2022/019740, mailed on Jun. 13, 2022, 13 pages.
International Preliminary Report on Patentability in International Appln. No. PCT/US2022/019740, mailed on Oct. 5, 2023, 8 pages.

* cited by examiner

ROAD ELEMENT SENSORS AND IDENTIFIERS

CROSS REFERENCE TO RELATED APPLICATION

This application is a continuation of U.S. application Ser. No. 17/465,480, filed Sep. 2, 2021, which is a continuation of U.S. application Ser. No. 17/210,099, filed Mar. 23, 2021, now U.S. Pat. No. 11,138,873, issued Oct. 5, 2021, the contents of which are incorporated by reference herein.

BACKGROUND

Vehicles can travel on roadways, highways, and back-roads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this specification relates to a system that can identify, monitor, and share vehicle information amongst sensors. Generally, in the space of intelligent transportation systems (ITS), the Society of Automotive Engineers (SAE) has defined various standards of autonomous driving. These standards range from Level 0 (e.g., fully manual and controlled by the operator) to Level 5 (e.g., fully autonomous and controlled by the vehicle). SAE J3016, one particular standard, includes a Level 2 active safety system, which enables both longitudinal positions and lateral control of the vehicle. For example, in the Level 2 active safety system, operators are required to drive as driver support features are engaged in a vehicle and the operators must constantly monitor these driver support features to maintain safety on the road. The driver support features can include, for example, vehicles providing steering, braking, and accelerating support to the driver as well as lane centering and adaptive cruise control at the same time.

To enable and facilitate the performance of Level 2 active safety systems, the technologies described in this specification provide for monitoring the positions and movement of vehicles along a road to ensure the driver support features are being met. In particular, a system is described that can acquire sensor data regarding a road actor or a vehicle moving on a road in a particular direction. The system can generate and monitor sensor data to describe characteristics of vehicles on the road. The characteristics can include the vehicles in a lane, the speed of those vehicles, the position of those vehicles, and the speed of those vehicles in relation to one another. Additionally, the system can monitor the same set of characteristics when the road includes one or more vehicle spanned across multiple lanes on a road.

In some implementations, the system can include sensors placed in a longitudinal manner along the side of the road to monitor the entrance and exit of vehicles, the position of the vehicles, and their movement amongst other vehicles on the road. The sensors can communicate with one another in a bidirectional manner. Additionally, the sensors can communicate with a central server that houses sensor data and can receive and provide alerts indicative of a detected vehicular event. The vehicular event can include a change in the order of vehicle positions, a new vehicle entering the road due to an on-ramp entrance, and a vehicle exhibiting anomalous behavior, to name a few examples.

In some implementations, the sensors can be placed on one side of a road or both sides of the road when monitoring vehicles. Each sensor can be spaced at a predetermined distance apart along the side of the road, and each sensor has their own field of view for monitoring a designated area or segment of the road. In some implementations, the field of view of each sensor may overlap with one another to ensure continuity for viewing the road in its entirety. In other implementations, the field of view of each sensor may not overlap but rather be juxtaposed with one another to ensure the widest coverage of the road. The sensors themselves can include a LIDAR system, a video camera, a radar, a Bluetooth system, and a Wi-Fi system, to name a few examples.

Because each sensor is placed along the road with a segment or portion of the road in its field of view, the first sensor (in the longitudinal list of sensors) can identify an object (or vehicle) on the road as the object enters the first sensor's field of view. This identity describes the identified object in a way that is unique to that object. The first senor can generate this unique identity by first identifying distinguishing features of that object and then combining those distinguishing features to generate an Object Identification Characteristic (OIC). The OIC can include a unique hexadecimal value or a string that describes the observable properties of the object. One important feature of this process is that the license plate (or other personal identifying information) is not included as one of the observable features.

In some implementations, in response to the first sensor generating an OIC for a detected object, the first sensor adds the OIC to a list. The list can indicate one or more objects identified in a lane on the road in the order the objects appeared. In some implementations, the sensor can expand the list out to a matrix, where each column of the matrix corresponds to a list and each list in the matrix corresponds to a particular lane on the road. Thus, the sensors can encode the lane space of the road in a matrix or array representation. When another object appears in the first sensor's field of view, the sensor generates another OIC for the next detected object and adds that OIC to the list, placing it behind (or below) the OIC for the previously identified object. The first sensor performs this process for each object that appears in its field of view when generating the list or matrix.

Generally, the first sensor generates a list for each object identified in its field of view on a frame-by-frame basis. For example, in a first frame, the first sensor may identify a first object and a second object. In a second frame, the first sensor may identify a first object, a second object, and a third object that has just entered its field of view, in the order in which they appeared. Thus, in the first frame, the first sensor can generate a first list with an OIC for a first object followed by an OIC for a second object. Then, for the second frame, the first sensor can generate a second list with an OIC for the first object followed by an OIC for a second object followed by another OIC for a third object. Thus, the first sensor can identify each object and can store an identifier for each object in a list on a per frame basis in the order the object appeared.

When the first sensor detects that an object it has previously detected in one of its frames has fallen out of the field of view (e.g., such as the first object), the first sensor propagates the latest generated list of OICs to the next sensor in order of longitudinal direction along the traffic direction of the road. The next sensor (e.g., second sensor) receives the list of OICs from the first sensor. Then, the second sensor confirms that the order of the objects represented by the list received from the first sensor matches the order of objects the second sensor sees in its field of view. Rather than the second sensor regenerating an OIC for each object seen in its field of view, processing and bandwidth are saved because the second sensor only needs to perform a confirmation on the received list.

In this confirmation, the second sensor can identify each object as the object enters its field of view. For example, after the second sensor receives the list from the first sensor and upon detecting that an object has entered its field of view, the second sensor can identify one or more observable properties of the detected object. Then, the second sensor can use the observable properties to ascertain whether the detected object corresponds to the same object (i.e., the first object) identified by the first OIC in the received list from the first sensor. For example, the second sensor can identify the color of the detected object and possibly one or two more properties of the detected object. Then, the second sensor can compare these identified properties with properties found in the first OIC in the list.

In this comparison, the second sensor can check whether the identified color of the detected object matches the color found in the first OIC. If the colors are the same, the second sensor can cease processing and deem a match has been found. Although this may reduce accuracy in certain instances, such as where the first detected object and the second detected object are both black and the second sensor has yet to discern whether the first object is actually the first object seen by the first sensor, the processing performed by the second sensor is substantially reduced.

Alternatively, the second sensor can also check an observable feature, which is found in the first OIC, in addition to the color. For example, after checking color, the second sensor can check the object volume and compare that to the volume found in the first OIC string. The number of observable features the second and subsequent sensors may check before deeming a match or mismatch can be learned over a time or predetermined by a user.

In some implementations, the features of the OIC are concatenated together in a particular order. The order can indicate portions (e.g., strings, bits, or bytes) that correspond to certain observable features of the object. The order may vary depending on predetermined rules set by the designer. Each sensor checks the predetermined rules to understand how the OIC is concatenated together. For example, the first portion of the OIC may correspond to color, the second portion of the OIC may correspond to volume, and the third portion of the OIC may correspond to an object class. By checking the predetermined rules, each sensor can determine an order for checking the observable features of the detected object. The predetermined rules may be stored locally on each sensor or stored at the central server and communicated to each sensor.

If the second sensor determines a match has been found, then the second sensor waits for another object to enter its field of view. Alternatively, if the second sensor determines a match has not been found after checking each feature of the first OIC, then the second sensor compares the observable features of the detected object with properties found in the second OIC in the received list. If a match is found, then the second sensor generates an alert and transmits the alert to the central server to indicate that the second object has now moved ahead of the first object (in the same lane). The alert can include, for example, information identifying the second sensor, the list the second sensor received from the first sensor, and the change in the order of objects in the list. If a match is not found with any of the OICs in the list, then the second sensor generates an alert that indicates a new object has been detected (by way of entering the lane between the first and second sensor) and transmits the alert to the central server.

In some implementations, the central server will only receive a list or a matrix (if the sensors monitor a road with multiple lanes) if a sensor detects an object event, as previously mentioned. If the changes for a list or a matrix only exist in the timestamp, then the sensor(s) does not migrate or propagate data to the central server.

In some implementations, when a detected object exits the second sensor's field of view, the second sensor propagates the list or matrix to the next sensor (i.e., third sensor) down the line where the processing repeats for each sensor. In some implementations, the sensor can propagate the list at a particular rate before the detected object exits the field of view. This rate can include a ratio of the frame rate of inputs at the sensor, the frame rate of outputs at the sensor, the speed of the objects traversing through the field of view, and the adjacency of the corresponding field of view.

This system enables the sensors to track objects on a road with a reduction in power consumption. For example, only the first sensor in a longitudinal line of sensors is required to generate a list or matrix of OICs from the detected objects on a frame-by-frame basis. The subsequent sensors only need to then validate the order and items found in the list generated by the first sensor. The latter process is therefore much less processing intensive than the former process.

Additionally, the system as a whole reduces bandwidth overall by minimizing the amount of communications between the sensors and the central server. Large amounts of data from the sensors are generated on a frame-by-frame basis. By keeping this data local to the sensors during generating and confirmation of the lists, and only pushing the lists to the central server when order changes, bandwidth can be preserved.

In one general aspect, a method is performed by a system. The method includes: a central server and a plurality of sensors positioned in a fixed location relative to a roadway, wherein each sensor in the plurality of sensors is configured to: detect vehicles in a first field of view on the roadway, and for each detected vehicle: identify features of the detected vehicle; for each feature, generate feature data representing the feature; generate a unique identification of the detected vehicle from the detected vehicles by concatenating the feature data representing the identified features of the detected vehicle; and add the unique identification to a list.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes the identified features comprise a color of the detected vehicle, a class of the detected vehicle, and a volume of the detected vehicle, and the identified features does not include a license plate of the detected vehicle.

In some implementations, the method includes the unique identification of the detected vehicle comprises a hexadecimal value, or a string representation.

In some implementations, the method further comprises: a first sensor configured to: detect a vehicle from the detected vehicles has exited the first field of view; propagate the list to a second sensor, wherein the plurality of sensors are positioned in a longitudinal manner relative to the roadway and the second sensor is positioned in order after the first sensor; and the second sensor is configured to: receive the list from the first sensor; in response to receiving the list from the first sensor, detect the vehicles in a second field of view on the roadway; identify a first feature of the detected vehicles; and compare the identified first feature to a portion of the unique identification found in the received list.

In some implementations, the method further comprises: the second sensor configured to: in response to the comparison, determine the identified first feature matches the portion of the unique identification found in the received list; and stop processing the first feature against the received list.

In some implementations, the method further comprises: the second sensor configured to: in response to the comparison, determine the identified first feature does not match the portion of the unique identification found in the received list; compare the identified first feature to a portion of a second unique identification found in the list; in response to the comparison, determine the identified first feature matches the portion of the second unique identification found in the list; and transmit an alert to the central server indicating that an order of the list has changed, indicating that a first vehicle has switched positioned with a second vehicle.

In some implementations, the method further comprises: the second sensor configured to: detect that another vehicle from the detected vehicles has exited the second field of view; propagate the list to a third sensor, wherein the third sensor is positioned in order after the second sensor; and the third sensor is configured to: receive the list from the second sensor; in response to receiving the list from the second sensor, detect the vehicles in a third field of view on the roadway; identify a first feature of the detected vehicles; compare the identified first feature to a portion of the unique identification found in the received list; in response to the comparison, determine the identified first feature does not match the portion of the unique identification found in the received list; compare the identified first feature to a portion of a second unique identification found in the received list; in response to the comparison, determine the identified first feature does not match the portion of the second unique identification found in the received list; compare the identified first feature to a portion of a third unique identification found in the received list; in response to the comparison, determine the identified first feature matches the portion of the third unique identification found in the list; and transmit an alert to the central server indicating that a vehicle corresponding to the third unique identification is moving in a backward direction on the roadway.

In some implementations, the method includes a velocity with which the vehicle is moving in the backward direction on the roadway is proportional to a rate of change of the third unique identifications backwards movement in the list.

In some implementations, the method further comprises: the second sensor configured to: in response to the comparison, determine the identified first feature does not match the portion of the unique identification found in the received list; compare the identified first feature to each portion of remaining unique identifications found in the received list; in response to the comparison, determine the identified first feature does not match any unique identification found in the received list; and transmit an alert to the central server indicating that a new vehicle has entered the roadway between the field of view of the first sensor and the field of view of the second sensor.

In some implementations, the method further comprises: add the unique identification to a matrix, wherein each column of the matrix is a list associated with a lane of the roadway and the list represents a spatial representation of the lane of the roadway.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
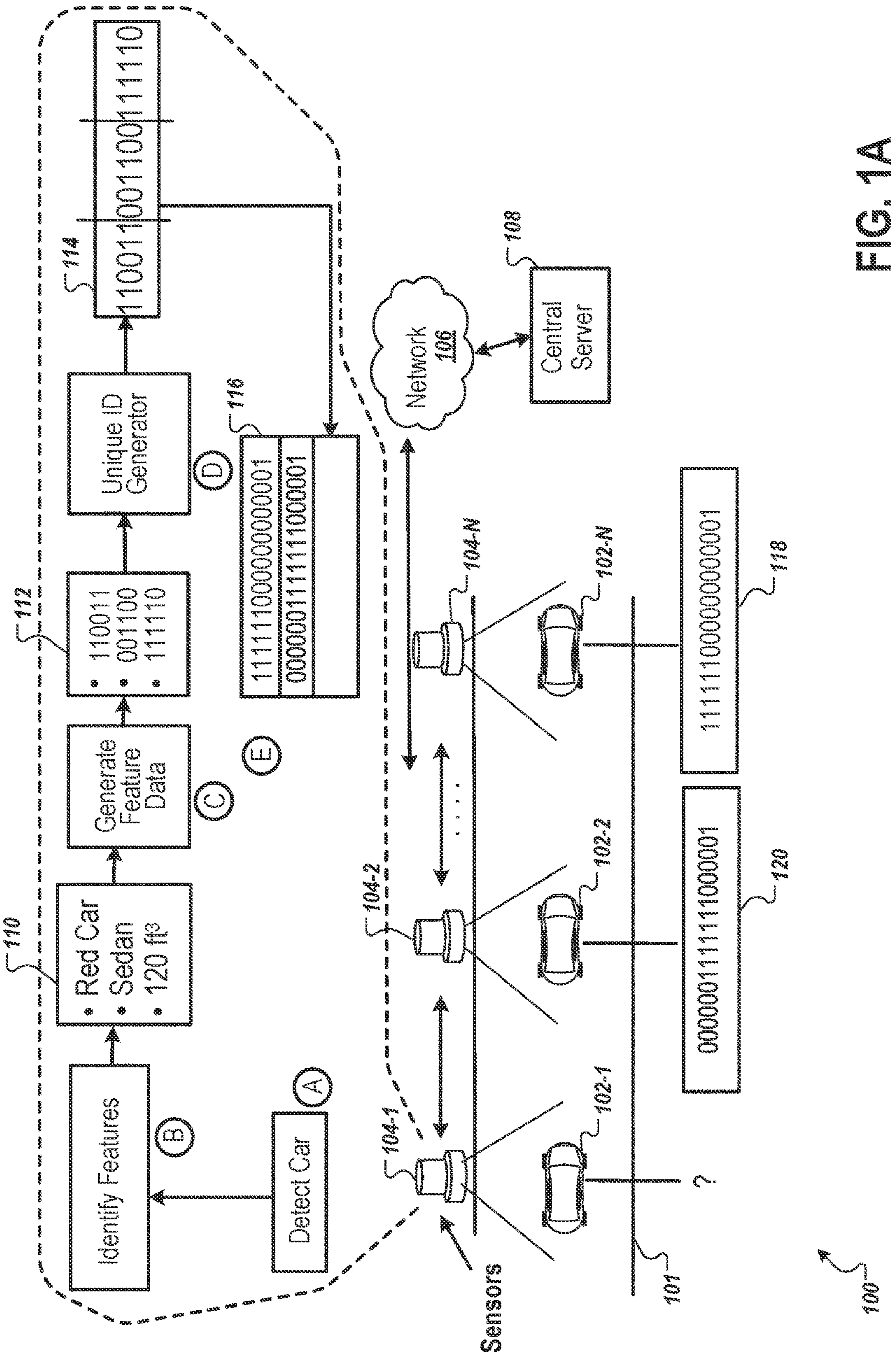
FIG. 1A is a block diagram that illustrates an example system for identifying and monitoring vehicles in a road.

FIG. 1A is a block diagram that illustrates an example system 100 for identifying and monitoring vehicles on a road. The system 100, deployed along a road 101 on which vehicles 102-1-102-N travel, includes a plurality of sensors 104-1 through 104-N, a network 106, and a central server 108. In this example, the system 100 illustrates the processes performed by sensor 104-1, the first sensor in a longitudinal row of sensors. The system 100 illustrates three sensors and three vehicles, but there may be more or less sensors and more or less vehicles in other configurations. Additionally, the road 101 is shown with one lane showing the vehicles traveling in a particular direction. The road 101 may alternatively include more than one lanes of vehicles traveling in the same direction as well as more than one lane of vehicles traveling in opposing directions. FIG. 1A illustrates various operations in stages (A) to (E) which can be performed in the sequence indicated or in another sequence.

In general, the system 100 can provide the techniques for monitoring vehicles on the road 101. The sensors 104-1 to 104-N (collectively, "sensors 104") can acquire sensor data regarding a particular road actor moving on the road 101 in a particular direction. The system can generate and monitor sensor data that can not only describe the vehicles but also illustrate by way of a representation of the vehicles in a lane, the speed of those vehicles, and the relationship of those vehicles to one another on a per frame basis. Examples of the objects that the same can detect and identify can include a vehicle, such as a car, a semi-truck, a motorcyclist, and even a bicyclist. The system can also identify a person that is moving along the road 101, such as along the sidewalk adjacent to the road or crossing the street. The system can identify other objects that present itself on the road 101, such as a pet or an obstruction that may impede the flow of traffic.

The sensors 104 can include a variety of software and hardware devices that monitor objects on road 101. For example, the sensors 104 can include a LIDAR system, a video camera, a radar system, a Bluetooth system, and a Wi-Fi system to name a few examples. A sensor can include a combination of varying sensor types. For example, sensor 104-1 can include a video camera and a radar system; sensor 104-2 can include a video camera and a radar system; and, sensor 104-N can include a video camera, a radar system, and a Wi-Fi system. Other sensor combinations are also possible.

A sensor can detect the objects on the road 101 through its field of view. Each sensor can have a field of view set by the designer of the system 100. For example, if sensor 104-1 corresponds to a video camera, the field of view of the video camera can be based on the type of lens used (e.g., wide angle, normal view, and telephoto, for example) and the depth of the camera field (e.g., 20 meters, 30 meters, and 60 meters, for example). In other examples, if the sensor 104-2 corresponds to a LIDAR system, the parameters required for use would include the point density (e.g., a distribution of the point cloud), field of view (e.g., angle in which the LIDAR sensor can view), and line overlap (e.g., a measure to be applied that affects ground coverage).

The field of view of each sensor becomes important because the system 100 can be designed in a variety of ways to enhance monitoring of objects on the road 101. For example, a designer may seek to overlap fields of view of adjacent sensors to ensure continuity for viewing the road 101 in its entirety. Additionally, overlapping field of view regions may facilitate monitoring areas where objects enter the road 101 through vehicle on-ramps or exit the road 101 through vehicle off-ramps. In other another example, the designer may decide not to overlap the fields of view of adjacent sensors but rather, juxtapose the fields of view of adjacent sensors to ensure the widest coverage of the road 101. In this manner, the system 100 can monitor and track more vehicles at a time.

In addition, each sensor can include memory and processing components for monitoring the objects on the road 101. For example, each sensor can include memory for storing a list that tracks the objects identified on the road in the order they appear to a sensor. The processing components can include, for example, video processing, sensor processing, transmission, and receive capabilities. Each of the sensors can also communicate with one another over the network 106. The network 106 may include a Wi-Fi network, a cellular network, a Bluetooth network, or some other communicative medium.

The sensors 104 can also communicate with a central server 108 over network 106. The central server 108 can include one or more servers and one or more databases connected locally or over a network. The central server 108 can store data that represents the sensors in the system 100. For example, the central server 108 can store data that represents the sensors 104 that are available to be used for monitoring. The data can indicate which sensors are active, which sensors are inactive, the type of data recorded by each sensor, and data representing the fields of view of each sensor. Additionally, the central server 108 can store data identifying each of the sensors 104 such as, for example, IP addresses, MAC addresses, and preferred forms of communication to each particular sensor. The data can also indicate the relative positions of the sensors 104 in relation to one another. In this manner, a designer can access the data stored in the central server 108 to learn what sensors are being used to monitor the objects on the road 101 and pertinent information for each of these sensors.

The central server 108 can also store data representing multiple lists generated by each of the sensors. As will be further described below, each sensor is capable of generating a list on a frame-by-frame basis. The list can indicate one or more objects detected by the sensor in the order in which the objects were detected in the sensor's field of view. For example, because each sensor is placed along the road 101 with a segment or portion of the road 101 in the sensor's field of view, the sensor can identify an object as the object enters the sensor's field of view. In response to the sensor detecting an object, the sensor can assign that object a particular identity. The particular identity can include a combination of data that represents distinguishing features of the object. After the sensor assigns that object a particular identity, the sensor adds the identity to a list. The list can correspond to a lane space representation of the road segment that that sensor sees on a frame-by-frame basis.

In some implementations, a sensor can expand the list out to a matrix. The matrix can include multiple concatenated lists, where each column of the matrix corresponds to a particular lane on the road 101. In some implementations, a matrix contains lanes for same direction of traffic. Thus, the sensor can encode the lane space of the road in a matrix or some other array representation that is to be understood by all the sensors and central server in the system 100. Therefore, when the sensor detects and uniquely identifies an object in its field of view and adds that identification to a list, the sensor is tracking a particular object. The next time the sensor detects an object, the sensor will generate a unique representation for that object and add that representation to the list, placing the representation at a row below the identification of the first object. In this manner, the sensor has detected two objects and stored representations of these objects in the order in which they have appeared.

In one example, the sensor may be monitoring two separate lanes, in which vehicles travel in the same direction. If the sensor detects and identifies a new vehicle in the first lane, then the sensor adds the unique representation for that object in the first column of the matrix. If the sensor detects and identifies a new vehicle in the second lane, then the sensor adds the unique representation for that object in the second column of the matrix. This process can occur for N number of lanes (corresponding to N columns in the matrix) monitored by the sensors. Each sensor then monitors the vehicles and the position of the vehicles found in the matrix. Thus, the matrix represents a lane representation of the road when the road includes multiple lanes.

As previously mentioned, when the sensor detects a particular object in its field of view, the sensor generates a unique identity of that object using its distinguishing detected features. Then, the sensor combines the data representing the distinguishing features to generate an Object Identification Characteristic (OIC) that uniquely identifies that object to the sensors. For example, the OIC can include a unique hexadecimal value or a string that describes the observable properties or features of the object. The observable properties can include the object color (as represented by Red-Green-Blue (RGB) characteristics), the object size (as calculated through analytics in the optical characteristics), the object class (as calculated through optical characteristics, and the volume of the object, to name a few examples. In some implementations, a feature of system 100 is that the license plate (or other personal identifying information, such as facial recognition information) is not included as one of the observable features, which may be difficult to detect. In this case, if the sensor detects personal identifying information, the sensor can disregard this information. In some examples, the OIC can also include a unique hash value that can be calculated by each of the sensors to reveal its true contents.

The sensor can identify and generate unique identifications for detected objects on a frame-by-frame basis. For example, the sensor can identify a first object and a second object in a first frame of data. Then, in the second frame, the sensor can identify a first object, then a second object, and then a third object that has just entered the field of view (and was not detected in the first frame). In this example, the sensor can generate a first list with an OIC for the first object followed by an OIC for a second object. The sensor can also add a timestamp to the first list (and to each list) to indicate when and which frame the list was created. For the second frame, the sensor can generate a second list with an OIC for the first object followed by an OIC for a second object followed by an OIC for a third object. The OICs can be stored in each row if the list is in column format. In other implementations, if the list is generated in a row format, the sensor can store each OIC in each column. Each time the sensor generates a list for a frame of data, the sensor can store the list in memory. For example, a frame can include a generated frame of video or a frame of LIDAR data. Alternatively, a frame can include every 50 milliseconds of data. Other alternatives of frame sizes can be included as well.

In some implementations, the sensor may need to offload the recorded media to a database on the network 106. The database may have large enough storage capabilities that can handle the bandwidth and requirements for storing video data on a per frame basis. For example, if a video camera sensor records media at 1080p 60 frames per second (fps), the video camera sensor may require terabytes worth of storage to store long recorded videos. The video camera sensor can also use a circular buffer for memory at the expense of storage but this can overwrite previously recorded footage that may be pertinent to the designer. In other implementations, the sensors 104 may not store the footage.

In subsequent frames, the sensor may detect that an object that it has detected in a previous frame has fallen out of its field of view. In response to the detection, the first sensor propagates the latest generated list of OICs to the next sensor in order of longitudinal direction along the traffic direction of the road. For example, each sensor may be placed in the ground next to the road and spaced a predetermined distance apart (e.g., 10 yards) from one another. The first sensor can store an indication of an order of the sensors in system 100. Thus, based on this order, the first sensor can determine where to propagate the latest generated list of OICs. The next sensor (e.g., second sensor) receives the list from the first sensor and confirms that the order of the objects represented by the list received from the first sensor matches the order of objects the second sensor sees in its field of view. In some implementations, the first sensor can pass a data type object to the second sensor when detecting that the object it has previously detected has fallen out of its field of view. For example, the data type object can be a struct, a class, or a tuple. In the data type objects, the first sensor can pass the generated list as well as the positions of each of the vehicles in order. Each of the sensors can perform this process of passing lists or data type objects to one another. In some implementations, the sensors can append a new list to the old list at the location of a new column. This creates a matrix that can be passed between sensors. This can be the case when the next sensor generates a list that is different from the old list, and appends the new list to the old list. Thus, processing is preserved at the second sensor because rather than regenerating an OIC for each object seen its field of view, the second sensor takes steps only to confirm the list.

If the second sensor determines that the list is out of order (e.g., indicating that a vehicle has moved ahead, behind another vehicle, a new vehicle has entered the road, a vehicle has exited the road, or some other change), then the second sensor regenerates a new list and transmits the new list to the central server 108 over network 106. In some implementations, the regenerated new list is appended to the previous list (at a new column) so each sensor and the central server 108 can track each list generated by each sensor in matrix form. The central server 108 receives the new list and stores the new list in memory and/or in a database. Additionally, the central server 108 can then transmit the new list to each of the sensors 104 so they have the new list in their possession that indicates the latest order of vehicles on the road 101. The central server 108 can store the newly generated list in a historical database for tracking purposes. Thus, the central server 108 maintains a database that stores a list for every change in vehicle position detected by the sensors 104 for the road 101.

During stage (A), the sensor 104-1 can detect that vehicle 102-1 has entered its field of view. The sensor 104-1 can record media of a segment or portion of the road 101 and process the media using object detection or some other form of classification to detect a moving object. The object detection can correspond to a moving vehicle, a moving person, a moving animal, or some object that impedes vehicles on the road 101. In the example of system 100, the sensor 104-1 has already detected, processed, identified, and stored data representations of vehicles 102-2 and 102-N in a particular list.

In some implementations, each of the sensors can detect vehicle 102-1 by performing data aggregations of observations over a window of time. The data aggregations improve the sensors' detectability of the vehicle 102-1 in its field of view. Additionally, the data aggregation can ensure that each sensor will identify and detect similar vehicles and their corresponding features.

During stage (B), the sensor 104-1 can identify one or more features of the vehicle 102-1 detected in its field of view. As mentioned, these features can include observable properties of the vehicle, such as the vehicle color (e.g., as represented by RGB characteristics), the vehicle size (e.g., as calculated through optical characteristics), the vehicle class (e.g., as calculated through optical characteristics), and the volume of the vehicle (e.g., as calculated through optical characteristics). For example, the sensor 104-1 can determine that vehicle 102-1 is a red colored vehicle, is over 120 $ft^3$ in size, is of a sedan type vehicle, and is a medium sized vehicle. The sensor 104-1 may also be able to determine one or more other characteristics of the vehicle, such as its rate of speed, the distance away from the sensor 104-1, the vehicle 102-1's direction of travel, and a number of individuals found in the vehicle 102-1, to name a few examples. The sensors 104 may also use the other characteristics in generating the OIC for the particular vehicle 102-1. However, the sensor does not include the license plate (or other personal identifying information, such as facial recognition information) as one of the observable features. In this case, if the sensor 104-1 detects personal identifying information of vehicle 102-1, the sensor 104-1 can disregard this information.

In some implementations, the type of components found at the particular sensor that detect the vehicle determine the characteristics that describe the vehicle. For example, sensor 104-1 may include a video camera and a radar system. The sensor 104-1 can then determine characteristics using the media recorded from the video camera and the electromagnetic reflectivity from the radar system. For example, the sensor 104-1 can determine color of the object, size of the object, distance from the object, rate of movement of the object, and direction of movement of the object. However, if the sensor 104-1 does not include the radar system, the sensor 104-1 can use other external components to determine the distance from the object, rate of movement of the object, and direction of movement of the object. For example, the sensor 104-1 may be able to utilize an external classifier to produce these results. The external classifier may be stored at the sensor 104-1 or stored at a location accessible to the sensor 104-1 over network 106. Thus, the system 100 can benefit from having a combination of components to improve the detection process found at each of the sensors.

As illustrated in system 100, the sensor 104-1 produces output features 110 related to the detected vehicle 102-1. The output features 110 indicate that the vehicle 102-1 is a red colored vehicle, is over 120 $ft^3$ in size, is of a sedan type vehicle, and is a smaller vehicle. During stage (C), the sensor 104-1 can then generate feature data 112 that represents each of these characteristics that describe the vehicle 102-1. For example, the feature data 112 can include a generated string, hexadecimal, binary, or byte representation that describes each characteristic. In other examples, the sensor 104-1 can use an algorithm to generate a bit or byte representation of each particular feature. The example of system 100 illustrates that the sensor 104-1 can generate feature data 112 having a feature of "110011" for the red color of vehicle 102-1 based on a color representation generation algorithm. The feature data 112 also includes a feature of "001100" for the representation that the vehicle 102-1 is of the sedan class and a feature of "111110" for the volume representation of the vehicle 102-1 being 120 $ft^3$ based on similar generation algorithms. The feature data 112 can also include a feature for the size of the vehicle. In another example, the sensor 104-1 can generate the color of the vehicle as a hexadecimal value, a class of a vehicle represented by an integer value, and a volume of the vehicle represented by a tuple value in meters (such as X, Y, Z coordinates of a bounding box). In some examples, the sensor 104-1 can generate other features and different representations (e.g., bits, bytes, symbols, or hexadecimals) for each of those features.

In some implementations, the sensor 104-1 can generate feature data 112 by performing sensor fusion. In the case that the sensor 104-1 utilizes multiple components (e.g., LIDAR, radar, and video camera), the sensor 104-1 can combine the observation from each of these components assign these observations to a point in space. The point in space can correspond to an N-dimensional value that describes the feature. Then, the sensor 104-1 can use features to calculate and classify that particular point in space. For example, the sensor 104-1 can enjoin data from the LIDAR system, the radar system, and the video camera. The LIDAR system can generate 1 point per centimeter for 150-meter range for viewing the road 101, for example. The radar system can perform the calculations that estimates where the vehicle or object is located in relation to the radar system. The video camera can estimate a volumetric projection of the identified object or vehicle based on a volumetric projection estimation algorithm. The sensor 104-1 can then calculate an identity product (the feature data) using the observations from each of these sensors, which can correspond to the hash of the observations. For example, the sensor 104-1 can calculate an identity product, e.g., a string/hash representation of the feature data and a timestamp the features were identified, from data provided by each of the sensors.

During stage (D), the sensor 104-1 generates a unique identification using the feature data 112. In some implementations, the sensor 104-1 concatenates the feature data 112 to generate an OIC 114. In other implementations, the sensor 104-1 can use the feature data 112 in a variety of ways to generate the OIC 114. For example, the sensor 104-1 can mix the feature data 112 together, scramble the feature data 112, or encrypt the feature data 112. In some examples, the sensor 104-1 can concatenate the feature data 112 together and execute a hashing algorithm on the concatenated feature data to ensure the values are secure and not easily read by intruders. For example, the hash algorithm can include a Message Digest 5 (MD5) or Secure Hash Algorithm (SHA). In the case that the sensor 104-1 executes a hash algorithm, each of the sensors 104 and the central server 108 can use the same hash algorithm for secure communications.

As illustrated in the system 100, the sensor 104-1 generates the OIC 114 by concatenating the feature data 112. For example, the OIC 114 corresponds to a string of "110011001100111110". The sensor 104-1 can use the OIC 114 to identify vehicle 102-1. Then, during stage (E), the sensor 104-1 adds OIC 114 to the list 116. As previously mentioned, the sensor 104-1 has detected, identified, generated, and stored OICs corresponding to vehicle 102-2 and 102-N. The OIC 114 is then stored in the third row of the list 116 behind the OICs for vehicles 102-N and 102-2, which the sensor 104-1 identified before identifying vehicle 102-1. The list order matches the order of the vehicles 102 direction of movement on road 101. Vehicle 102-N is ahead of vehicle 102-2, which is ahead of vehicle 102-1.

In some implementations, the list 116 can correspond to the list of vehicles seen by the sensor 104-1 at a particular frame. For example, the list 116 illustrates that the sensor 104-1 detects vehicles 102-1 to 102-N in its field of view, stored generated OICs for vehicles 102-N and 102-2, and is in the process of generating an OIC for vehicle 102-1. In other examples, in which sensor 104-1 detects one vehicle (e.g., vehicle 102-1) in its field of view for a particular frame, the sensor 104-1 can generate a list 116 with a single OIC for the one detected vehicle. As illustrated in the example of system 100, the sensor 104-1 has generated an OIC for vehicle 102-N to be "111111000000000001" and the OIC for vehicle 102-2 to be "000000111111000001."

Figure 1B:
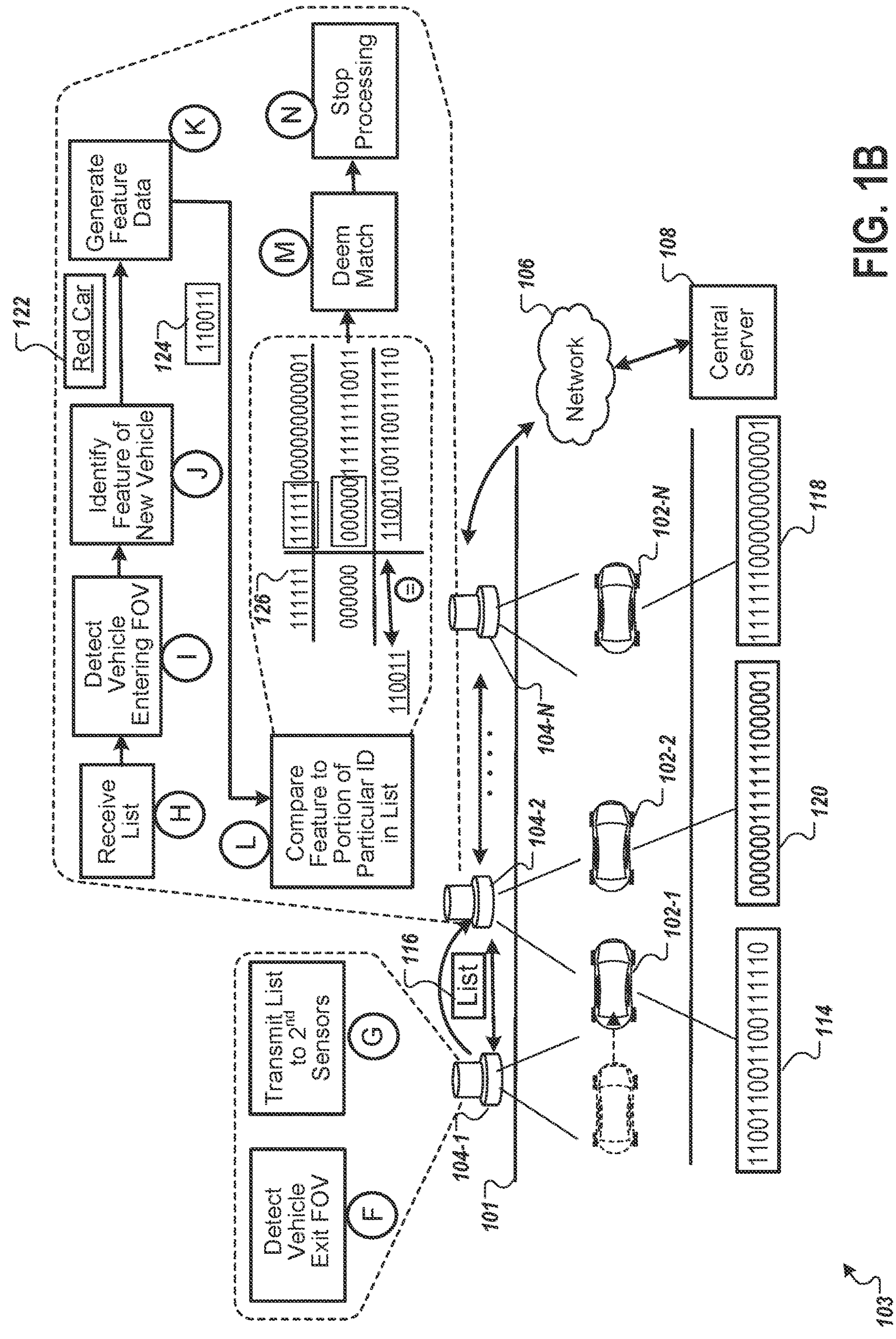
FIG. 1B is another block diagram that illustrates an example system for identifying and monitoring vehicles in a road.

FIG. 1B is another block diagram that illustrates an example system 103 for identifying and monitoring vehicles on a road. FIG. 1B is a continuation of the block diagram illustrated from FIG. 1A. FIG. 1B illustrates similar components to FIG. 1A. As illustrated in system 103, the vehicle 102-1, which was previously in the field of view of sensor 104-1 (as shown in system 100), has moved out of the field of view of sensor 104-1. The example of system 103 illustrates the processes that occur when a sensor detects that a previously detected vehicle has moved out of its field of view. FIG. 1B illustrates various operations in stages (F) to (N) which can be performed in the sequence indicated or in another sequence.

In some implementations, after stage (E), the sensor 104-1 can perform the processes for stage (A) through (E) for every recorded frame of media. For example, in a first frame, the sensor 104-1 detects vehicle 102-1 and records the OIC generated for this vehicle in the list 116. In a second frame (or subsequent frames), the sensor 104-1 can now reduce overall processing by not having to generate a new OIC but instead, comparing data representing the objects detected in the second frame to the list 116 to determine whether a change has occurred. The sensor 104-1 can identify one or more observable properties of the detected objects in its field of view in the order in which they appear. Then, the sensor 104-1 can then use the observable properties to ascertain whether the detected object corresponds to the same object (e.g., the OIC for vehicle 102-1) identified by the first OIC in the list 116. For example, the sensor 104-1 can identify the color of the detected object in the second frame, generate feature data for the color of the detected object, and compare the generated feature data to each portion of the OIC in the list 116. If the sensor 104-1 determines that the colors are the same as a result of the comparison (e.g., a match of corresponding values), then the sensor 104-1 waits to process the next frame of media.

During stage (F), the sensor 104-1 can detect that vehicle 102-1 has moved out of its field of view. Continuing with the prior example, the sensor 104-1 can determine that the color of the detected vehicle does not match any OIC corresponding to a vehicle in the list 116. In some implementations, the sensor 104-1 may determine that no objects are detected in a frame when the sensor 104-1 detected an object in the previous frame. In other implementations, another vehicle may have entered the field of view of sensor 104-1, while the vehicle 102-1 has exited the field of view of sensor 104-1. The sensor 104-1 may detect a color of the new vehicle that does not match the color of vehicle 102-1 (by way of comparison with the OIC for the vehicle 102-1 in the list 116) and thus, indicate that vehicle 102-1 has exited the field of view.

During stage (G), in response to the sensor 104-1 determining that the vehicle 102-1 has exited its field of view, the sensor 104-1 can transmit the most recently generated list to the next sensor in the direction of traffic. The sensor 104-1 can determine which sensor is the next sensor in a longitudinal line along the road 101. In some implementations, the sensor 104-1 may determine the next sensor by checking an order of the sensors. In other implementations, the sensor 104-1 may request from the central server 108 to indicate which sensor is the next sensor to receive the list. In response to receiving an indication from the central server 108 indicating which sensor to transmit the list (e.g., sensor 104-2), the sensor 104-2 can transmit the list 116 to sensor 104-2 over network 106.

In some implementations, the sensor 104-1 can transmit the list 116 to the sensor 104-2 at a particular rate. The rate can be a value that is proportional to the overlap of the fields of view between sensor 104-1 and 104-2. Therefore, the sensor 104-1 can calculate overlapping fields of view between its field of view and the field of view of sensor 104-2 and then the sensor 104-1 can off-board the list at a rate proportional to these overlapping fields of view. For example, during the course of standard performance by system 100, the longitudinal and lateral positions of the objects can be regularly identified and updated, as previously discussed. These position calculations inherently encode for the velocity of objects in system 100, e.g., the rate which they move through a local coordinate space. Because the coordinate space that each sensor observes can be established, a priori, a given sensor, such as sensor 104-2, can maintain a data table that represents the coordinate spaces these sensors proximal to that given sensor, such as sensor 104-1 and sensor 104-N, can observe. Therefore, the sensors can estimate a vector of a given object in a local coordinate space and project that vector into an adjacent sensor's coordinate space. The overall set of vectors can be used as a method to establish a flow rate between coordinate spaces. In other implementations, the sensor 104-1 can propagate the list to the sensor 104-2 at a ratio between the frame rate of input media, the frame rate of outputs, the speed of the vehicles traversing through the field of view, and then the adjacency of the corresponding field of view. For example, since each sensor can maintain the coordinate space that the proximal sensors observe, then each sensor can offload the list to proximal sensors using the flow rate between coordinate spaces.

During stage (H), the sensor 104-2 receives the list 116 from the sensor 104-1 over network 106. In some implementations, the sensor 104-2 may receive a notification from the sensor 104-1 indicating where the list 116 has been stored. For example, the sensor 104-1 may store the list 116 in an external database and provide an index to the sensor 104-2 for accessing the list 116.

During stage (I), the sensor 104-2 can detect one or more vehicles entering its field of view. The sensor 104-2 can process the media on a frame-by-frame basis, analyzing for objects that enter, move through, and leave its field of view. For example, after the sensor 104-2 receives the list 116, the sensor 104-2 analyzes media for a newly detected object. As illustrated in system 103, vehicle 102-1 has entered the field of view of sensor 104-2, which the sensor 104-2 detects.

During stage (J), the sensor 104-2 can identify a feature of the newly detected vehicle that will be used to identify the vehicle. For instance, the sensor 104-2 can identify a color, a size, class, or a volume of the vehicle or some combination of these features. The sensor 104-2 can use its components (e.g., video recording, LIDAR, radar system, and Bluetooth) to identify one or more features of the detected vehicle. As illustrated in system 103, the sensor 104-2 can identify that the vehicle 102-1 is of a red color 122.

In this case, the sensor 104-2 can identify a minimal amount of features needed to ascertain the identity of a vehicle. For example, the sensor 104-2 can identify one feature of the newly detected vehicle 102-1, such as the color, to determine that the vehicle found in the OIC in the list 116 matches the newly detected vehicle. In another example, the sensor 104-2 can identify two features of the newly detected vehicle 102-1, such as the color and the size of the vehicle, to accurately ascertain the identity of the newly detected vehicle. More than one feature of the newly detected vehicle may be required for identification in the case that the list 116 stores OICs that have similar features. For example, if the list 116 includes multiple OICs each having the same color, then the sensor 104-2 would need an additional feature to distinguish between the multiple OICs. Alternatively, the sensor 104-2 may require using more than one feature to identify an OIC to improve the accuracy of the detection system. The sensors 104 can use less features to identify the vehicles and thereby increase processing speed of the system but reduce the accuracy of the system. On the other hand, the sensors 104 can use more features to identify the vehicles, which reduces overall processing speed (lengthening the amount of processing required), but ultimately improves the accuracy of the system. The designer can set the characteristics of the system as a tradeoff between processing speed and accuracy. In some implementations, the characteristics can scale according to traffic density, e.g., very light traffic may require fewer matches as the likelihood of aliasing on a lower number of features is reduced relative to the likelihood when using the same number of features for very dense traffic.

During stage (K), the sensor 104-2 can generate feature data corresponding to the identified feature of the detected vehicle. Stage (K) is similar to stage (C) in that the feature data can correspond to a generated string, a hexadecimal value, a binary value, or a byte representation that describes the identified feature.

During stage (L), the sensor 104-2 can compare the generated feature data corresponding to the identified feature of the detected vehicle to various portions of the OICs in the list. For example, as illustrated in table 126, the sensor 104-2 stores the received list with a single column showing rows of the individual vehicles that sensor 104-1 has detected. The sensor 104-2 has already determined that the vehicle 102-N and vehicle 102-2 has passed through its field of view. In particular, the sensor 104-2 has detected one or more features of vehicle 102-N, generated feature data for the one or more features of vehicle 102-N, and compared the feature data to the first OIC in the list. In the example of system 103, the sensor 104-2 generated feature data of "111111" and compared it to various portions of the OIC of "111111000000000001". In some examples, the sensor 104-2 can perform string matching, substring matching, byte matching, or XOR'ing to find the feature data in the OIC. In other examples, the sensor 104-2 can compare the feature data to the corresponding feature of the OIC using hash comparisons. If a match occurs, then the sensor 104-2 can deem that the vehicle corresponding to the OIC matches the vehicle seen by the sensor 104-2.

In the example of system 103, the sensor 104-2 can note that the first entry in the list corresponds to the first vehicle (e.g., vehicle 102-N) seen by sensor 104-1. Therefore, the first vehicle seen by the sensor 104-2 should also be vehicle 102-N. The sensor 104-2 can save on processing and bandwidth because only a small amount of features need to be identified and processed for confirming the order of the list. If the sensor 104-2 determines that the feature data for the detected vehicle is found in the first OIC of the list, then the sensor 104-2 can determine that it has seen the same first vehicle (vehicle 102-N) as seen by sensor 104-1.

In some examples, if the sensor 104-2 is not able to match the feature data for the detected vehicle to the first OIC in the list, the sensor 104-2 may process another feature of the detected vehicle to determine if an error occurred in processing. In this case, the sensor 104-2 can generate feature data for the size of the detected vehicle (e.g., 120 $ft^3$) when the color feature data did not match to the first OIC. If the sensor 104-2 matches the feature data for the size of the detected vehicle to the first OIC in the list, then the sensor 104-2 may determine that an error occurred in processing the color of the detected vehicle. However, in most cases, if the sensor 104-2 does not match the feature data for color of the detected vehicle to the feature data for color in the first OIC, the sensor 104-2 can proceed to check the second OIC in the list. This situation will be further elaborated upon below.

After the sensor 104-2 matches the feature data for the color of the detected vehicle to the feature data for the color in the first OIC, the sensor 104-2 waits for another frame of recorded in media. In subsequent frames of recorded media, the sensor 104-2 continues to process a feature of data for the same detected vehicle against the first OIC in the list. When an object is detected in a subsequent frame of media that is different from a previous detected object, the sensor 104-2 can determine that a new object has been detected. In the example of system 103, the sensor 104-2 has detected vehicle 102-2 entered its field of view. Continuing with the same process, the sensor 104-2 can identify one feature of the newly detected vehicle (e.g., the color) and generate feature data for the newly detected vehicle (e.g., "000000"). Then, in response to generating the feature data of the newly detected vehicle, the sensor 104-2 can compare the feature data to the second OIC in the list. In some implementations, the sensor 104-2 can skip a comparison to the first OIC in the list because the sensor 104-2 has already confirmed that a vehicle has been identified matching to the first OIC. By skipping the comparison to the first OIC, the sensor 104-2 can save time and reduce processing. In other implementations, the sensor 104-2 can initiate the comparison by first checking the first OIC in the list to ensure the same vehicle is not identified again. Although this additional comparison requires extra processing, the extra processing adds redundancy to the system to enhance the validity and accuracy of the system.

As illustrated in the example of system 103, the sensor 104-2 can determine that the feature data of "000000" does match to a portion of the second OIC in the list. In some implementations, the sensor 104-2 can speed up processing by checking a particular portion of the OIC. For example, each portion of the OIC can correspond to a particular feature of a vehicle. The first 6 bits can correspond to the detected vehicle's color, the next 6 bits can correspond to the vehicle's size, and the next 6 bits can correspond to the vehicle's class. In this way, the sensor 104-2 can resolve ambiguity in the case that the feature of "000000" is found in different positions in the OIC. For a particular feature (e.g., color), the sensor 104-2 can check the first 6 bits of the OIC. Other structures are also possible within this system, such as byte locations, hexadecimal locations, and string value locations in the OIC.

The matching performed by the sensor 104-2 can indicate that it has seen the vehicle 102-N first and the vehicle 102-2 second, in the order as they have appeared to the sensor 104-1 and now confirmed by sensor 104-2. At this point, the sensor 104-2 can continue to monitor its frames until it detects a new object (different from objects corresponding to vehicles 102-N and 102-2). In the example of system 103, the vehicle 102-1 can enter the field of view of the sensor 104-2. The sensor 104-2 can then perform the stages (I)-(K) and generate feature data of "110011" representative of the color of the vehicle 102-1. Given that the sensor 104-2 has already confirmed that the vehicle corresponding to the first OIC in the list and the vehicle corresponding to the second OIC in the list have been detected, the sensor 104-2 can compare the generated feature data of "110011" to third OIC in the list. If the comparison results in a match, then the sensor 104-2 can determine that the third vehicle is in fact the third vehicle seen by the sensor 104-1. Alternatively, if no match exists, the sensor 104-2 can determine that a new car has entered the road 101 which was unseen by the sensor 104-1.

As illustrated in the system 103, the sensor 104-2 compares the feature data of "110011" to the third OIC in the list—"110011001100111110". In particular, the sensor 104-2 compares the feature data of "110011" to the portion of the third OIC that corresponds to similar feature data—"110011001100111110". During stage (M), the sensor 104-2 can determine a match has been found. In response to determining that a match has been found, the sensor 104-2 stops processing any subsequent feature data for the newly detected vehicle (e.g., vehicle 102-1) and continues to monitor subsequent frames of media to identify any additional objects.

Figure 1C:
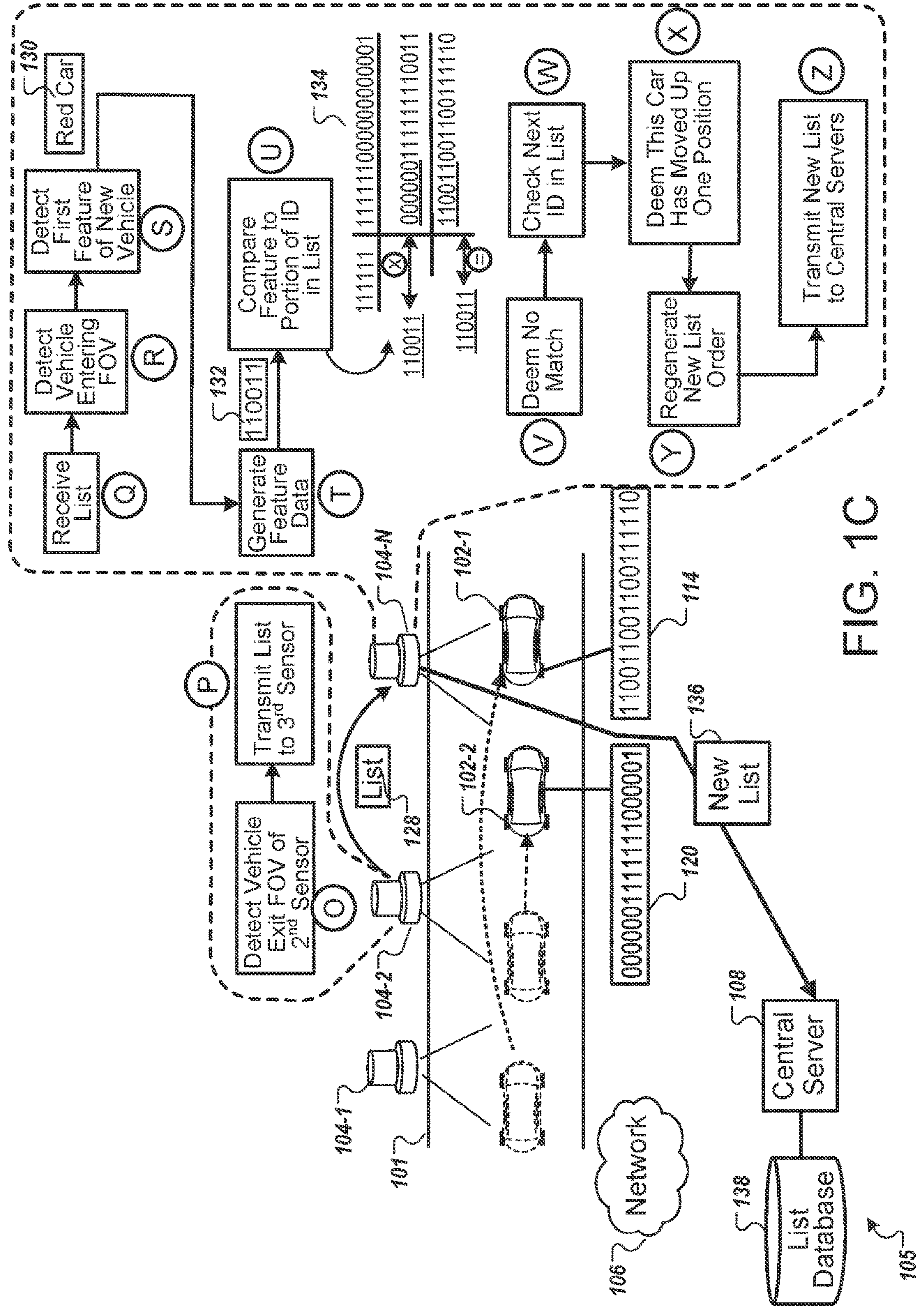
FIG. 1C is another block diagram that illustrates an example system for identifying and monitoring vehicles in a road.

FIG. 1C is another block diagram that illustrates an example system 105 for identifying and monitoring vehicles on a road. FIG. 1C is a continuation of the block diagram illustrated from FIGS. 1A and 1B. FIG. 1C illustrates similar components to FIG. 1A and FIG. 1B. As illustrated in FIG. 1C, the vehicle 102-1, which was previously in the field of view of sensor 104-1 (as shown in system 100 and illustrated by dotted lines in system 105), has now moved out of the field of view of sensor 104-1. The vehicle 102-1 has now been introduced in the field of view of sensor 104-N. Additionally, the vehicle 102-2, which was previously in the field of view of sensor 104-2 (as shown in system 103 and illustrated by dotted lines in system 105), has now moved out of the field of view of sensor 104-2. The movement of vehicle 102-2 out of the field of view of sensor 104-2 triggers the processing illustrated in system 105. FIG. 1C illustrates various operations in stages (O) to (Z) which can be performed in the sequence indicated or in another sequence.

During stage (O), the sensor 104-2 can detect that vehicle 102-2 has moved out of its field of view. In particular, the sensor 104-2 can determine that an identified feature of the vehicle 102-2 that was detected in previous frames is no longer detected in subsequent frames. In some implementations, the sensor 104-2 can determine no objects are detected in a current frame. Additionally, the sensor 104-2 may determine that vehicle 102-1, which has moved ahead of vehicle 102-2, entered the sensor 104-2's field of view and has exited the same field of view in a subsequent frame. The sensor 104-2 can determine (e.g., by way of comparison with each OIC in the list 116) and by determining that no object exists in its current frame that the vehicle 102-2 has exited the field of view.

During stage (P), in response to the sensor 104-2 determining that the vehicle 102-2 has exited its field of view, the sensor 104-2 can transmit the most recently generated list 128 created by the sensor 104-2 to the sensor 104-N. In some implementations, the sensor 104-2 can transmit the list 116 to the sensor 104-N in the case that the list 116 does not include one or more OICs representing newly identified vehicles added by sensor 104-2. The sensor 104-2 can add a new OIC to the list when the sensor 104-2 detects a new vehicle not currently represented by any of the OICs currently listed. In this particular example, when a sensor detects a new vehicle not currently represented by any of the OICs currently found in the list, a new vehicle may have entered the road 101. The new vehicle may enter the road 101 through an on-ramp that exists between two fields of view of two sensors or by some other means. In response to the sensor generating a new OIC for a new vehicle that does not match to any of the other OICs in the list, the sensor can transmit an alert with the new list to the central server 108 over network 106. In some implementations, in response to the central server 108 receiving the new list, the central server 108 stores the new list in the list database 138 and the central server 108 propagates the list to each of the other sensors in system 105. In other implementations, the sensor that generated the new list can transmit the new list to each of the other sensors for immediate use.

During stage (Q), the sensor 104-N receives the list 128 from the sensor 104-2 over network 106. In some implementations, the sensor 104-N may receive a notification from the sensor 104-2 indicating where the list 128 has been stored. In other implementations, the sensor 104-N may receive an encrypted version of the list that can only be decrypted by the sensors and the central server 108.

During stage (R), the sensor 104-N can detect one or more vehicles entering its field of view. As mentioned for stage (I), the sensor 104-2 can process media on a frame-by-frame basis and detect one or more objects in each frame that enter, move through, and exit the field of view. For example, as illustrated in system 105, the sensor 104-N can detect that vehicle 102-1 has entered its field of view.

During stage (S), the sensor 104-N can identify one or more features of the newly detected object that can be used for vehicle identification against the received list 128. For example, the sensor 104-N can identify one or more of a color of the vehicle, a size of the vehicle, a class of the vehicle, or a volume of the vehicle. The sensor 104-N may have one or multiple detection components to identify one or more features of the detected vehicle. In particular, the sensor 104-N may have a radar system, a Bluetooth system, a Wi-Fi system, a photography/video camera recording system, and a LIDAR system. Additionally, the sensor 104-N may utilize a combination of the detection components to identify one or more features of the newly detected object. As illustrated in system 105, the sensor 104-N can detect and identify that the vehicle 102-1 has a red color, as illustrated by label 130.

During stage (T), the sensor 104-N can generate feature data corresponding to the identified feature of the detected vehicle (e.g., vehicle 102-1). Stage T is similar to stages (C) and (K) in that the feature data can correspond to a generated string, a hexadecimal value, a binary value, or a byte representation that describes and/or represents the identified feature. In some implementations, the sensor 104-N may generate multiple feature data sets if the sensor 104-N identifies multiple features of the newly detected vehicle. For example, the sensor 104-N may generate a first feature data for the identified color of the newly detected vehicle and a second feature data for the size of the newly detected vehicle. In the example of system 105, the sensor 104-N generates a feature data 132 of "110011" to represent the detected color of vehicle 102-1.

During stage (U), the sensor 104-N can compare the generated feature data corresponding to the identified feature of the newly detected vehicle (or the generated feature data set corresponding to the identified features of the newly detected vehicle) to various portions of OICs in the list 128. For example, as illustrated in table 134, the sensor 104-N stores the received list 128 in memory with a single column for each of the vehicles identified and detected by sensor 104-2 on the road 101. The sensor 104-N has previously generated feature data for the vehicle 102-N (e.g., feature data of "111111") because the sensor 104-N has previously identified and detected the vehicle 102-N. Additionally, the sensor 104-N has compared the feature data for the vehicle 102-N (e.g., feature data of "111111") to the first OIC in the list 128. In particular, the feature data for the vehicle 102-N (e.g., "111111") corresponds to the color of the vehicle 102-N. In addition, the sensor 104-N has determined that the identified color of the vehicle 102-N matches to the color found in the first OIC. Thus, the sensor 104-N has confirmed that it has seen the same first vehicle as the sensor 104-2.

Once the sensor 104-N has detected another object (or vehicle) in a subsequent frame, the sensor 104-N can compare the feature data 132 of "110011" to the second OIC in the list 128. The sensor 104-N can skip the comparison of the feature data 132 to the first OIC because the sensor 104-N has already confirmed the first OIC in the list 128. In this case, the sensor 104-N can compare the feature data 132 "110011" to the color representation found in the second OIC of "000000111111110011". However, during stage (V), the sensor 104-N determines that a match has not been found. In some implementations, the sensor 104-N can identify an additional feature of the newly detected vehicle (e.g., the vehicle's size) and generate feature data for the additional identified feature. The sensor 104-N can then compare the newly generated feature data (e.g., feature data of "001100" corresponding to the size of vehicle 102-1) to the size feature data found in the second OIC (e.g., 000000111111110011"). However, the sensor 104-N may determine that no match is found.

During stage (W), the sensor 104-N can proceed to check the next OIC in the list 128 because the comparison to the second OIC in the list did not result in a match. In some implementations, a sensor can determine that a mismatch in comparison can indicate a variety of vehicular events. One vehicular event can indicate that the vehicle that was expected to be detected is no longer on the road. For example, that expected vehicle has moved to an off road position or has taken an off ramp to exit the road 101 in between the fields of view of sensors 104-2 and 104-N. Another vehicular event can indicate that another vehicle has changed position with the expected vehicle. For example, vehicle 102-1 may have accelerated and passed vehicle 102-2 before entering the field of view of sensor 104-N. In another example, vehicle 102-2 may have decelerated, which enabled other vehicles in proximity to pass the vehicle 102-2. Some vehicular events can occur when the vehicle is exhibiting erratic behavior such as, for example, driving backwards in the wrong direction on a one way road (e.g., road 101), or just driving in the wrong direction on a one way road. The sensors 104 can identify and detect erratic behavior, which will be further discussed below.

In some implementations, the sensor 104-N can check the third OIC in the list 128 because the first OIC has already been accounted for and the second OIC resulted in a mismatch. Thus, the sensor 104-N can compare the newly generated feature to the color feature data found in the third OIC. For example, the sensor 104-N can compare the feature data of "110011" to the color feature data in "110011001100111110" and determine that a match has occurred. In other implementations, the stages of (V) and (W) can continue and repeat until a match is found or until each OIC in the list 128 has been checked.

In some implementations, in the case that each OIC in the list 128 has been checked and deemed a mismatch, the sensor 104-N can generate a new OIC for the newly detected vehicle. For example, the sensor 104-N can execute the functions associated with stages (A) through (G) in system 100 when generating the new OIC for the newly detected vehicle. The sensor 104-N can then insert the newly generated OIC in the row behind or below the most recently identified OIC. For example, the sensor 104-N can insert that newly generated OIC below the OIC of "111111000000000001" as the most recently matched OIC. In response, the sensor 104-N can transfer the newly generated list to the central server 108 or to each of the other sensors over network 106.

Continuing with the example, during stage (X), in response to determining the feature data of "110011" matches to the color feature data in the OIC of "110011001100111110," the sensor 104-N can determine that the vehicle represented by the third OIC has moved up one position. Said another way, the sensor 104-N can determine that it has seen a different order of vehicles than the previous sensor (e.g., sensor 104-2) and even earlier sensors if the same list has been passed between previous sensors. In particular, the sensor 104-N can determine that the third OIC should be moved to a different position in the order of the list 128.

During stage (Y), the sensor 104-N can regenerate the order of list 128. The sensor 104-N can regenerate the order of list 128 to match the order of the vehicles it detected in its field of view. For example, the sensor 104-N can keep the first OIC of "111111000000000001" in the first row of the list and insert the previous third OIC of "110011001100111110" in the second row of the list. As a result, the previous second OIC of "000000111111110011" now moves to the third row in the newly generated list 136. At this point, the sensor 104-N can determine that the first OIC and the second OIC have been confirmed. When the sensor 104-N detects a new vehicle or object in a subsequent frame, the sensor 104-N can identify a feature of the newly detected object and compare corresponding feature data to the relevant portion of the third OIC in the list. However, the other sensors 104 and the central server 108 in the system 105 are unaware of the change in the order of vehicle positions. To remedy this situation, the sensor 104-N can make the other sensors and the central server 108 aware of the list change.

During stage (Z), the sensor 104-N can transmit the newly generated list 136 to the central server 108 over network 106. In some implementations, in response to the central server 108 receiving the newly generated list 136, the central server 108 can push the newly generated list 136 to each of the other sensors in the system 105. In other implementations, the sensor 104-N can transmit the newly generated list 136 to each of the other sensors in the system 105. The sensor 104-N can transmit the newly generated list 136 to the next sensor in a longitudinal line in both directions. For example, if system 105 includes 10 sensors and sensor 104-5 detected the change in order of the vehicles, the sensor 104-5 can transmit the newly generated list 136 to sensors 104-4 and 104-6. Then, the sensor 104-4 transmits the newly generated list 136 to sensor 104-3 and the sensor 104-6 transmits the newly generated list 136 to sensor 104-7. This process can repeat until each of the sensors have received the newly generated list 136. In other implementations, the sensor 104-5 can transmit the newly generated list 136 to all sensors 104-1 to 104-4 and 104-6 to 104-10 at once. The sensor 104-5 can transmit the list 136 to the other sensors and the central server 108 over network 106.

In some implementations, when the other sensors receive the list 136 from the central server 108 or the sensor that generated the list, the other sensors take action to utilize the list 136. For example, when the sensor 104-N transmits the list 136 to the central server 108 and the central server 108 pushes the list 136 to sensors 104-1 and 104-2, the sensors 104-1 and 104-2 receive the list 136 and compare the list 136 to their current list. In some cases, the sensors 104-1 and 104-2 can determine whether one or more new OICs has been added to the list 136, whether the order of the existing OICs has changed, or a combination of both. The sensors 104-1 and 104-2 can make the changes to their own lists in response to determining the changes that occurred. In other cases, the sensors 104-1 and 104-2 can delete their old list and replace with the list 136.

The central server 108 can communicate with a list database 138 that can store the list changes detected and identified by each of the sensors. The list database 138 can store tables of data that relate list changes indexed by the sensor that identified the list change. Additionally, the central server 108 can store the list changes based on a timestamp. When a sensor, such as sensor 104-N, detects a list change, the sensors 104-N can add a timestamp to the newly generated list. The central server 108 can store the newly generated list in order by timestamp. In this manner, a designer can view of each of the lists generated by the sensors and determine how the vehicles have repositioned themselves as they traverse down the road 101.

In some implementations, a designer is notified when erratic vehicular behavior is detected. For instance, as previously mentioned, one example of erratic vehicular behavior can include that a vehicle is driving backwards in the wrong direction on a one-way road or driving in the wrong direction on a one-way road. The sensors 104 can detect this situation. In particular, when the vehicle enters the road 101 and begins traveling in the wrong direction, the first sensor that detects this vehicle (e.g., sensor 104-N) can detect that this vehicle does not match any of the OICs found in the list. Ultimately, the sensor 104-N can insert this vehicle's corresponding generated OIC in the first row of the list. As the vehicle travels in the opposite direction down the road 101, the next sensor in the longitudinal line of sensors (e.g., sensor 104-2) can receive the list from the sensor 104-N (because the vehicle will have exited the field of view of sensor 104-N). Then, the sensor 104-2 can identify one or more features of the newly detected vehicle traveling in the wrong direction, and compare corresponding generated feature data to the OICs in the received list. Depending on when the sensor 104-2 detects and identifies the backwards traveling vehicle in comparison to detecting other vehicles traveling on the road in the correct direction, the sensor 104-2 may need to adjust the position of the OIC corresponding to the backwards traveling vehicle in the list. If the vehicle continues to travel down the road 101 in the opposite direction, the sensors 104 can send a warning to the central server 108 over network 106 to indicate that a car is exhibiting erratic behavior. The central server 108 can contact the authorities or a designer of the system in response to receiving the warning to indicate that a vehicle is exhibiting erratic behavior.

In some implementations, as the vehicle travels backwards, the OIC corresponding to the backwards traveling vehicle can traverse down the list. In particular, since each sensor monitors a list on a per frame basis, as the backwards traveling vehicle moves, that vehicle moves in a direction that is opposite to the flow of traffic. As illustrated in stages (A) through (E), as newly detected vehicles travel in the correct direction, the sensor adds a new OIC to the bottom of the list. However, when a car travels backwards, the first sensor that notices the car traveling backwards, can add the corresponding OIC to the first row in the list. In subsequent frames, the backwards traveling car can travel in the opposite direction and the sensor will start to differentiate between backwards traveling cars and forwards traveling car moving away from each other. Thus, in the subsequent frames, the sensor can note that the backwards traveling car is now further behind the forward traveling car (where in previous frames this case was reversed). Therefore, the sensor can move the OIC down to the next row in the list. This process can continue on a per frame basis as the backwards traveling car continues to travel in the wrong direction. In doing so, the OIC for the backwards traveling car will traverse down the list at a rate of change corresponding to the velocity with which the vehicle is moving. The sensors 104 can detect this change and notify the authorities along with the central server 108 that a particular vehicle is exhibiting this kind of erratic behavior.

When the backwards traveling car moves out of the first sensor's field of view, the first sensor can transmit the list to the next sensor along the longitudinal line of sensors. The second sensor can receive the list, detect the newly entered backwards traveling vehicle, identify one or more features of the vehicle, and compare generated feature data from the one or more features to each OIC in the list. In this example, the first sensor may have placed the OIC corresponding to the backwards list in the second row of the list. The second sensor continues to process subsequent frames of media that include the vehicle traveling backwards until the vehicle traveling backwards leaves its field of view. When the second sensor detects that the backwards traveling car leaves its field of view, the second sensor transmits the list with the OIC corresponding to the backwards traveling car now in the third row, for example. The third sensor can receive the list and can detect the backwards traveling car as it enters the third sensor's field of view. The third sensor can identify one or more features of the backwards traveling car and compare generated feature data from the one or more features to each OIC in the list. In this example, the third sensor can compare the generated feature data to a portion of the OIC in the first row and deem no match found. Then, the third sensor can compare the generated feature data to a portion of the OIC in the second row and deem no match found. Lastly, the third sensor can compare the generated feature data to a portion of the OIC in the third row and deem a match has been found.

In some implementations, the sensors 104 can keep track of the number of times an OIC representing a vehicle has moved down positions in the list. If a sensor has determined a particular OIC has moved down the list, that sensor can transmit a notification to the other sensors that includes the new list as well as an indication that a particular OIC has moved down the list. If the sensors 104 collectively determine that the number of times the particular OIC moved down the list exceeds a threshold, such as moved 3 times down, then the particular sensor that detects the third movement (or the movement that meets the threshold) can generate and transmit an alert to the central server 108 over network 106. The alert can indicate that a vehicle represented by the OIC that has moved three positions down the list is moving in a backward direction on the roadway. The alert can also include the recorded media from the sensors, the threshold number, and each of the lists from the sensors that illustrate the particular OIC moving down the list.

In some implementations, the sensors 104 can determine whether a vehicle has pulled off to the side of the road 101 and is now stationary. If a particular sensor can see the same vehicle in each frame and determine that the vehicle has no velocity, then the particular sensor can deem that vehicle as stationary. Additionally, the particular sensor can detect and identify other vehicles passing around the stationary vehicle.

In some implementations, the road 101 may split into more than one road. In this case, the system 103 would include one or more sensors longitudinal to the direction of traffic on both roads that diverge from the split of road 101. For example, should the last sensor on road 101 before the split detect that a vehicle has exited its field of view, the last sensor can bifurcate the list and transmit the bifurcated list to the first sensor on both roads. If the list is in fact a matrix with two columns (indicative of road 101 being a double-lane road), and the fork in the road splits the two lanes, then the last sensor can bifurcate the matrix in a similar manner. Alternatively, if the road 101 is a single-lane road and the fork in the road splits the lane into two lanes, then the last sensor can transmit the same list to sensors on both roads.

Figure 2:
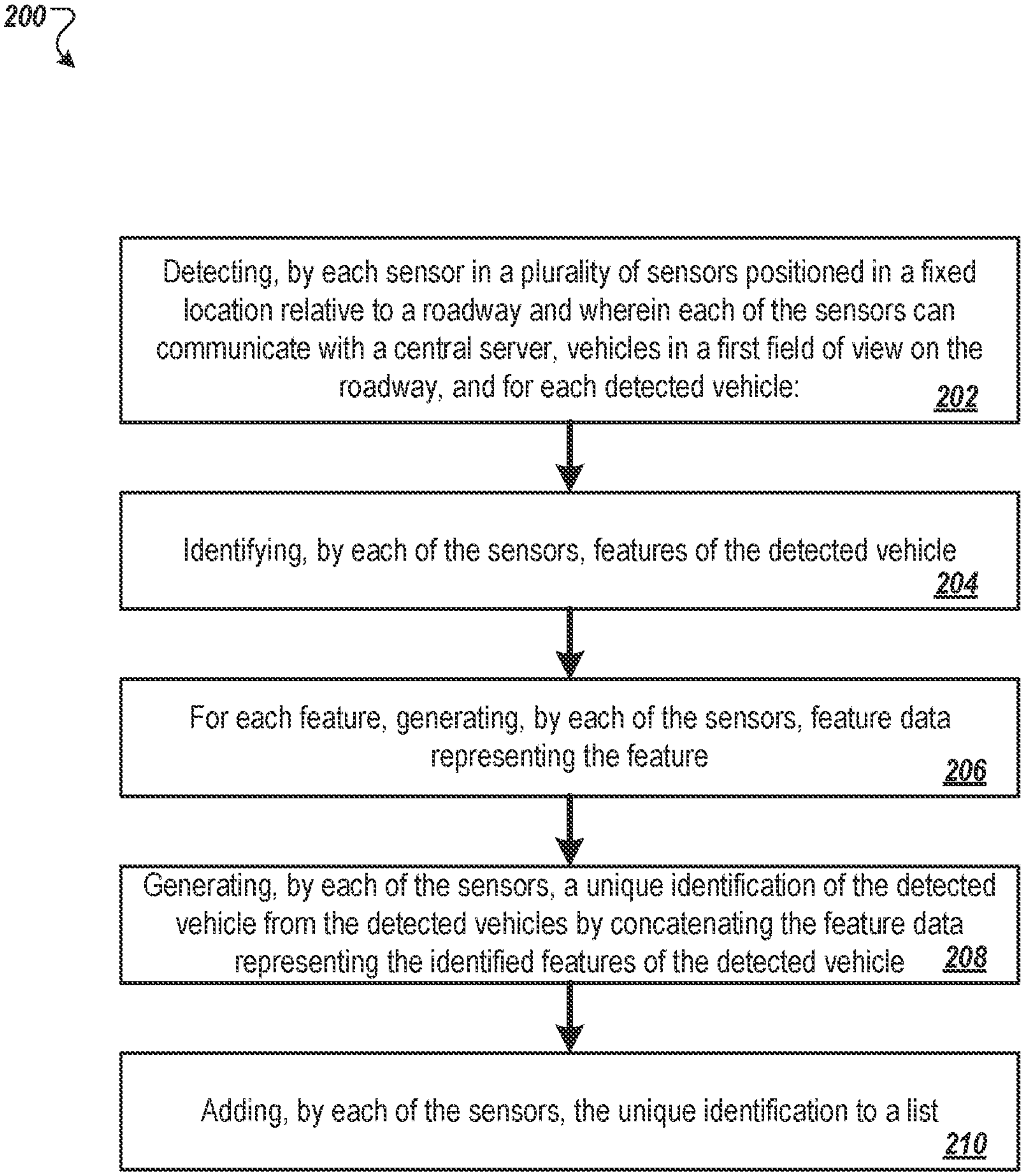
FIG. 2 is a flow diagram that illustrates an example of a process for detecting vehicles in a roadway using sensors and assigning identifications to each of these detected vehicles.

FIG. 2 is a flow diagram that illustrates an example of a process 200 for detecting vehicles in a roadway using sensors and assigning identifications to each of these detected vehicles. The sensors, such as sensors 104, may perform the process 200.

In the process 200, each sensor in a plurality of sensors are position in a fixed location relative to a roadway and each sensor can communicate with a central server. Moreover, each sensor can detect vehicles in a first field of view on the roadway (202). For example, the plurality of sensors can be positioned longitudinal to the direction of traffic on the roadway. Each sensor can be placed in the ground at a predetermined distance apart from one another. Additionally, each sensor's field of view can be positioned towards a segment or area of the roadway to detect and monitor vehicles. For each detected vehicle, the sensors can perform the operations as described below. A sensor can detect a particular vehicle in its field of view. The sensor can use object detection or some form of classification to detect an object in its field of view.

For example, a sensor can identify features of the detected vehicle (204). The sensor can detect one or more features of the detected vehicle. The one or more features can correspond to the observable properties of the vehicle, such as the vehicle color (e.g., as represented by RGB characteristics), the vehicle size (e.g., as calculated through optical characteristics), the vehicle class (e.g., as calculated through optical characteristics), and the volume of the vehicle (e.g., as calculated through optical characteristics). For example, the sensor can identify that a vehicle is blue colored, is 100 $ft^3$ in size, is of a small sedan, and is a smaller size vehicle. The sensor can also can identify other features. However, personal identifying information, such as a license plate or facial recognition information, is not include as one of the identified features.

The sensor can generate feature data representing the feature (206). For example, the sensor can generate a string, a hexadecimal value, a binary value, a byte representation, or some other representation that defines the identified feature of the vehicle. If the identified feature corresponds to a green colored vehicle, the sensor can generate a corresponding feature of "00001111". In another example, if the identified feature corresponds to a vehicle size of 130 $ft^3$, then the sensor can generate a corresponding hexadecimal feature of "AFB1E2". In other examples, the sensor can perform sensor fusion by combining the observations from multiple components at the sensor (e.g., radar, camera, and LIDAR), classifying the combination of observations, and calculating an identity product of the combinations that corresponds to the particular feature data for an identified feature.

The sensor can generate a unique identification of the detected vehicle from the detected vehicles by concatenating the feature data representing the identified features of the detected vehicle (208). For example, the sensor can concatenate the generated feature data to generate an OIC. Continued with the example from 206, the sensor can generate an OIC that reads "00001111AFB1E2". In other examples, the sensor can mix the feature data, scramble the feature data, encode, and/or encrypt the feature data to generate a particular OIC.

The sensor can add the unique identification to a list (210). The particular sensor can add the OIC to a particular row in the list. In some implementations, if the particular sensor is the first sensor in a row of longitudinal sensors, then the first sensor can generate a list and add the OIC to the first row in the list. In other implementations, if the particular sensor is not the first sensor, then that sensor can add the OIC corresponding to the detected vehicle to the list at the row indicated by the order in which the vehicle was detected.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

monitoring, by at least first and second sensors, a roadway of traversing vehicles;

detecting, by the first sensor, a first vehicle traveling along the roadway;

assigning, by the first sensor, an identifier for the first vehicle;

updating, by the first sensor, a data component with the identifier;

transmitting, by the first sensor, the data component to the second sensor;

receiving, by the second sensor, the data component from the first sensor;

detecting, by the second sensor, a second vehicle traveling along the roadway;

generating, by the second sensor, data of the detected second vehicle;

comparing, by the second sensor, the generated data of the second vehicle to one or more portions of the identifier in the data component;

based on the comparison, determining, by the second sensor, that the generated data of the second vehicle does not match the one or more portions of the identifier in the data component;

in response to determining that the generated data of the second vehicle does not match the one or more portions of the identifier in the data component, accessing, by the second sensor, another identifier from the data component;

comparing, by the second sensor, the generated data of the second vehicle to one or more portions of the other identifier accessed from the data component; and based on comparing the generated data to the one or more portions of the other identifier accessed from the data component:

determining, by the second sensor, that (i) the generated data of the second vehicle matches to the one or more portions of the other identifier accessed from the data component, (ii) the second vehicle matches to the first vehicle, and (iii) the second vehicle has moved positions on the roadway from when previously detected by the first sensor.

2. A computer-implemented method comprising:

detecting, by a first sensor of a plurality of sensors, a first vehicle traveling along a roadway;

assigning, by the first sensor, an identifier for the first vehicle;

updating, by the first sensor, a first data component with the identifier, the first data component storing a plurality of identifiers in a first order;

transmitting, by the first sensor, the first data component to a second sensor;

receiving, by the second sensor, the first data component from the first sensor;

detecting, by the second sensor, a second vehicle traveling along the roadway;

generating, by the second sensor, data of the detected second vehicle;

comparing, by the second sensor, the generated data of the detected second vehicle to one or more portions of the identifier in the first data component;

based on the comparison, determining, by the second sensor, that the generated data of the detected second vehicle does not match the one or more portions of the identifier in the first data component;

in response to determining that the generated data of the detected second vehicle does not match the one or more portions of the identifier in the first data component, determining, by the second sensor, the generated data of the detected second vehicle matches to another identifier in the first data component;

generating, by the second sensor, a second data component storing the plurality of identifiers, the second data component storing the plurality of identifiers (i) in a second order the second sensor detected the vehicles and (ii) the second order being different from the first order; and transmitting, by the second sensor, the second data component to the plurality of sensors.

3. A computer-implemented method comprising:

detecting, by a first sensor, a first vehicle traveling along a roadway of traversing vehicles;

assigning, by the first sensor, an identifier for the first vehicle;

updating, by the first sensor, a data component with the identifier;

transmitting, by the first sensor, the data component to a second sensor;

receiving, by the second sensor, the data component from the first sensor;

detecting, by the second sensor, one or more vehicles traveling along the roadway;

generating, by the second sensor, data for each of the one or more detected vehicles;

comparing, by the second sensor, data for each of the one or more detected vehicles to one or more portions of one or more identifiers in the received data component;

identifying, by the second sensor, a location of the identifier of the first vehicle in the received data component based on the comparison;

determining, by the second sensor, the location of the identifier of the first vehicle has moved a predetermined number of locations based on the generated data for each of the one or more detected vehicles;

in response to determining the location of the identifier of the first vehicle has moved the predetermined number of locations, generating, by the second sensor, data indicating the first vehicle is traveling in a backwards direction; and transmitting, by the second sensor and to one or more authorities, the data indicating the first vehicle is traveling in the backwards direction on the roadway.

4. A computer-implemented method comprising:

receiving, by a first sensor in a plurality of sensors monitoring vehicles on a roadway, data indicative of one or more vehicles seen by another sensor, the receiving indicative of the other sensor detecting the one or more vehicles exiting a field of view of the other sensor;

detecting, by the first sensor, one or more other vehicles on the roadway;

generating, by the first sensor, data for each of the one or more other detected vehicles;

comparing, by the first sensor, data for each of the one or more other detected vehicles to a portion of the data indicative of the one or more vehicles seen by the other sensor;

based on comparing the data for each of the one or more other detected vehicles to the portion of the data indicative of the one or more vehicles seen by the other sensor, determining, by the first sensor, a match between the data of another detected vehicle to the portion of the data indicative of a vehicle seen by the other sensor; and determining, by the first sensor, to cease processing of the data indicative of the one or more vehicles seen by the other sensor.

5. A computer-implemented method comprising:

detecting, by a first sensor, a plurality of first vehicles traveling along a roadway;

assigning, by the first sensor, an identifier for each detected vehicle of the plurality of detected first vehicles;

updating, by the first sensor, a data component with each of the assigned identifiers;

transmitting, by the first sensor, the data component to a second sensor;

receiving, by the second sensor, the data component from the first sensor;

detecting, by the second sensor, a plurality of second vehicles traveling along the roadway;

generating, by the second sensor, data for each detected vehicle of the plurality of detected second vehicles;

comparing, by the second sensor, the data for each detected vehicle of the plurality of detected second vehicles to data in the data component; and based on comparing the data for each detected vehicle of the plurality of detected second vehicles to the data in the data component, determining, by the second sensor, a number of the plurality of detected second vehicles is less than a number of the plurality of detected first vehicles in the data component.

6. A computer-implemented method comprising:

detecting, by a first sensor, a plurality of first vehicles traveling along a roadway;

assigning, by the first sensor, an identifier for each detected vehicle of the plurality of detected first vehicles;

updating, by the first sensor, a data component with each of the assigned identifiers;

transmitting, by the first sensor, the data component to a second sensor;

receiving, by the second sensor, the data component from the first sensor;

detecting, by the second sensor, a plurality of second vehicles traveling along the roadway;

generating, by the second sensor, data for each detected vehicle of the plurality of detected second vehicles;

comparing, by the second sensor, the data for each detected vehicle of the plurality of detected second vehicles to data in the data component; and based on comparing the data for each detected vehicle of the plurality of detected second vehicles to the data in the data component, determining, by the second sensor, a number of the plurality of detected second vehicles is greater than a number of the plurality of detected first vehicles in the data component.

7. One or more non-transitory computer-readable media storing instructions that, when executed, cause one or more computer processors to perform operations comprising:

monitoring, by at least first and second sensors, a roadway of traversing vehicles;

detecting, by the first sensor, a first vehicle traveling along the roadway;

assigning, by the first sensor, an identifier for the first vehicle;

updating, by the first sensor, a data component with the identifier;

transmitting, by the first sensor, the data component to the second sensor;

receiving, by the second sensor, the data component from the first sensor;

detecting, by the second sensor, a second vehicle traveling along the roadway;

generating, by the second sensor, data of the detected second vehicle;

comparing, by the second sensor, the generated data of the second vehicle to one or more portions of the identifier in the data component;

based on the comparison, determining, by the second sensor, that the generated data of the second vehicle does not match the one or more portions of the identifier in the data component;

in response to determining that the generated data of the second vehicle does not match the one or more portions of the identifier in the data component, accessing, by the second sensor, another identifier from the data component;

comparing, by the second sensor, the generated data of the second vehicle to one or more portions of the other identifier accessed from the data component; and based on comparing the generated data to the one or more portions of the other identifier accessed from the data component:

determining, by the second sensor, that (i) the generated data of the second vehicle matches to the one or more portions of the other identifier accessed from the data component, (ii) the second vehicle matches to the first vehicle, and (iii) the second vehicle has moved positions on the roadway from when previously detected by the first sensor.

8. One or more non-transitory computer-readable media storing instructions that, when executed, cause one or more computer processors to perform operations comprising:

detecting, by a first sensor of a plurality of sensors, a first vehicle traveling along a roadway;

assigning, by the first sensor, an identifier for the first vehicle;

updating, by the first sensor, a first data component with the identifier, the first data component storing a plurality of identifiers in a first order;

transmitting, by the first sensor, the first data component to a second sensor;

receiving, by the second sensor, the first data component from the first sensor;

detecting, by the second sensor, a second vehicle traveling along the roadway;

generating, by the second sensor, data of the detected second vehicle;

comparing, by the second sensor, the generated data of the detected second vehicle to one or more portions of the identifier in the first data component;

based on the comparison, determining, by the second sensor, that the generated data of the detected second vehicle does not match the one or more portions of the identifier in the first data component;

in response to determining that the generated data of the detected second vehicle does not match the one or more portions of the identifier in the first data component, determining, by the second sensor, the generated data of the detected second vehicle matches to another identifier in the first data component;

generating, by the second sensor, a second data component storing the plurality of identifiers, the second data component storing the plurality of identifiers (i) in a second order the second sensor detected the vehicles and (ii) the second order being different from the first order; and transmitting, by the second sensor, the second data component to the plurality of sensors.

9. One or more non-transitory computer-readable media storing instructions that, when executed, cause one or more computer processors to perform operations comprising:

detecting, by a first sensor, a first vehicle traveling along a roadway of traversing vehicles;

assigning, by the first sensor, an identifier for the first vehicle;

updating, by the first sensor, a data component with the identifier;

transmitting, by the first sensor, the data component to a second sensor;

receiving, by the second sensor, the data component from the first sensor;

detecting, by the second sensor, one or more vehicles traveling along the roadway;

generating, by the second sensor, data for each of the one or more detected vehicles;

comparing, by the second sensor, data for each of the one or more detected vehicles to one or more portions of one or more identifiers in the received data component;

identifying, by the second sensor, a location of the identifier of the first vehicle in the received data component based on the comparison;

determining, by the second sensor, the location of the identifier of the first vehicle has moved a predetermined number of locations based on the generated data for each of the one or more detected vehicles;

in response to determining the location of the identifier of the first vehicle has moved the predetermined number of locations, generating, by the second sensor, data indicating the first vehicle is traveling in a backwards direction; and transmitting, by the second sensor and to one or more authorities, the data indicating the first vehicle is traveling in the backwards direction on the roadway.

10. One or more non-transitory computer-readable media storing instructions that, when executed, cause one or more computer processors to perform operations comprising:

receiving, by a first sensor in a plurality of sensors monitoring vehicles on a roadway, data indicative of one or more vehicles seen by another sensor, the receiving indicative of the other sensor detecting the one or more vehicles exiting a field of view of the other sensor;

detecting, by the first sensor, one or more other vehicles on the roadway;

generating, by the first sensor, data for each of the one or more other detected vehicles;

comparing, by the first sensor, data for each of the one or more other detected vehicles to a portion of the data indicative of the one or more vehicles seen by the other sensor;

based on comparing the data for each of the one or more other detected vehicles to the portion of the data indicative of the one or more vehicles seen by the other sensor, determining, by the first sensor, a match between the data of another detected vehicle to the portion of the data indicative of a vehicle seen by the other sensor; and determining, by the first sensor, to cease processing of the data indicative of the one or more vehicles seen by the other sensor.

11. One or more non-transitory computer-readable media storing instructions that, when executed, cause one or more computer processors to perform operations comprising:

detecting, by a first sensor, a plurality of first vehicles traveling along a roadway;

assigning, by the first sensor, an identifier for each detected vehicle of the plurality of detected first vehicles;

updating, by the first sensor, a data component with each of the assigned identifiers;

transmitting, by the first sensor, the data component to a second sensor;

receiving, by the second sensor, the data component from the first sensor;

detecting, by the second sensor, a plurality of second vehicles traveling along the roadway;

generating, by the second sensor, data for each detected vehicle of the plurality of detected second vehicles;

comparing, by the second sensor, the data for each detected vehicle of the plurality of detected second vehicles to data in the data component; and based on comparing the data for each detected vehicle of the plurality of detected second vehicles to the data in the data component, determining, by the second sensor, a number of the plurality of detected second vehicles is less than a number of the plurality of detected first vehicles in the data component.

12. One or more non-transitory computer-readable media storing instructions that, when executed, cause one or more computer processors to perform operations comprising:

detecting, by a first sensor, a plurality of first vehicles traveling along a roadway;

assigning, by the first sensor, an identifier for each detected vehicle of the plurality of detected first vehicles;

updating, by the first sensor, a data component with each of the assigned identifiers;

transmitting, by the first sensor, the data component to a second sensor;

receiving, by the second sensor, the data component from the first sensor;

detecting, by the second sensor, a plurality of second vehicles traveling along the roadway;

generating, by the second sensor, data for each detected vehicle of the plurality of detected second vehicles;

comparing, by the second sensor, the data for each detected vehicle of the plurality of detected second vehicles to data in the data component; and based on comparing the data for each detected vehicle of the plurality of detected second vehicles to the data in the data component, determining, by the second sensor, a number of the plurality of detected second vehicles is greater than a number of the plurality of detected first vehicles in the data component.

* * * * *